Figure 1:
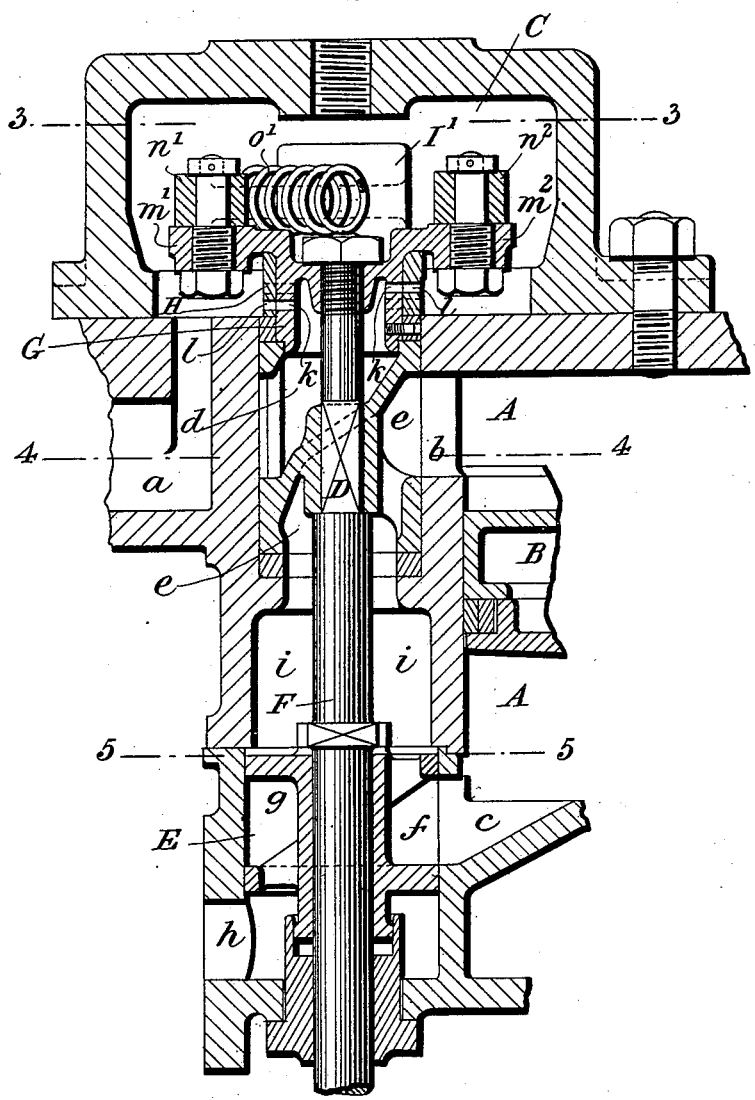

No. 626,800. Patented June 13, 1899.
A. B. WILSON.
APPARATUS FOR REGULATING ADMISSION OF MOTIVE FLUIDS TO ENGINES.
(Application filed Nov. 22, 1898.)
(No Model.) 5 Sheets—Sheet 1.

WITNESSES: Fred White Thomas F. Wallach

INVENTOR: Alexander Basil Wilson, By his Attorneys.

No. 626,800. Patented June 13, 1899.
A. B. WILSON.
APPARATUS FOR REGULATING ADMISSION OF MOTIVE FLUIDS TO ENGINES.
(Application filed Nov. 22, 1898.)
(No Model.) 5 Sheets—Sheet 3.

WITNESSES:
Fred White
Thomas F. Wallace

INVENTOR:
Alexander Basil Wilson.
By his Attorneys:
Arthur E. O'Brien & Co.

No. 626,800. Patented June 13, 1899.
A. B. WILSON.
APPARATUS FOR REGULATING ADMISSION OF MOTIVE FLUIDS TO ENGINES.
(Application filed Nov. 22, 1898.)
(No Model.) 5 Sheets—Sheet 4.
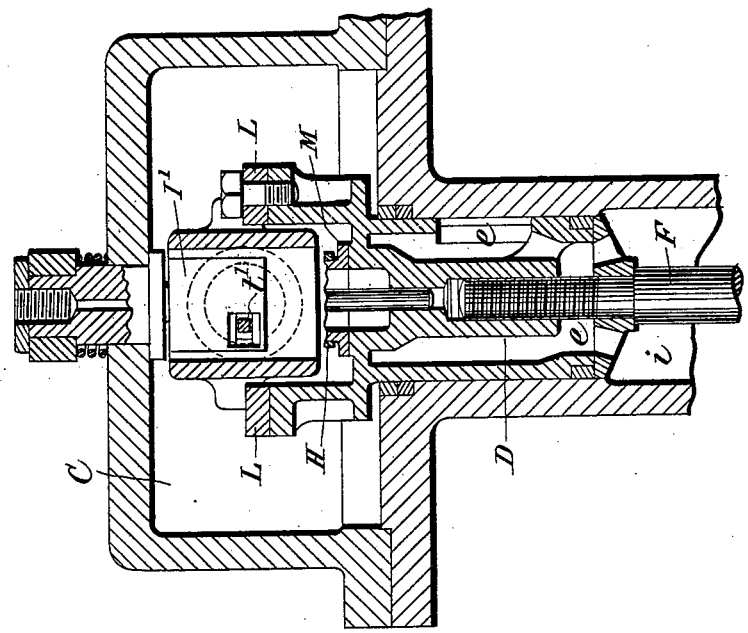
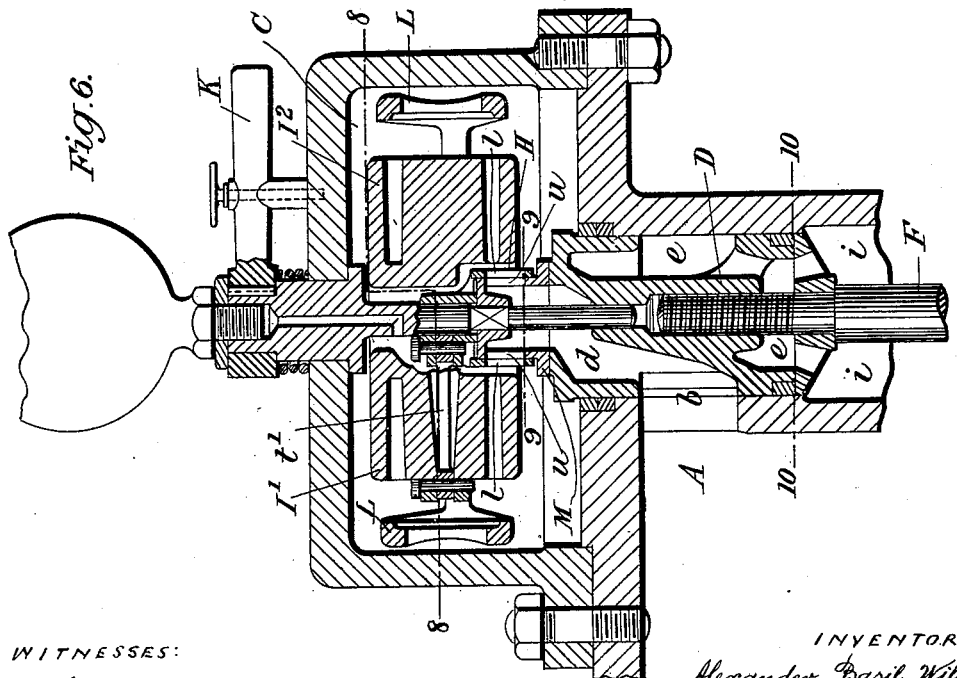
WITNESSES: INVENTOR
Fred White Alexander Basil Wilson,
Thomas F. Hallad By his Attorneys No. 626,800. Patented June 13, 1899.
A. B. WILSON.
APPARATUS FOR REGULATING ADMISSION OF MOTIVE FLUIDS TO ENGINES.
(Application filed Nov. 22, 1898.)

(No Model.) 5 Sheets—Sheet 5.

WITNESSES:
Fred White
Thomas F. Wallace

INVENTOR:
Alexander Basil Wilson.
By his Attorneys:
Arthur C. Fraser & Co.

UNITED STATES PATENT OFFICE.

ALEXANDER BASIL WILSON, OF HOLYWOOD, IRELAND.

APPARATUS FOR REGULATING ADMISSION OF MOTIVE FLUIDS TO ENGINES.

SPECIFICATION forming part of Letters Patent No. 626,800, dated June 13, 1899.

Application filed November 22, 1898. Serial No. 697,151. (No model.)

*To all whom it may concern:*

Be it known that I, ALEXANDER BASIL WILSON, engineer, of Holywood, in the county of Down, Ireland, have invented certain new and useful Improvements in Apparatus for Regulating the Admission of Motive Fluid to Engines, of which the following is a specification.

This invention consists of improvements in apparatus for regulating the admission of the motive fluid (hereinafter referred to as "steam") to steam or other fluid pressure engines.

These improvements are mainly applicable to what are known as "high-speed single-acting steam-engines," in which live steam is admitted on one side of the engine-piston only. Hitherto such engines have generally been constructed with piston-valves or slide-valves having a reciprocating motion derived from an eccentric or eccentrics on the engine crank-shaft or from other equivalent gear. They have also been sometimes constructed with rotary valves. Now such engines as hitherto constructed to work with reciprocating valves have of necessity been complicated and expensive by reason of the number of working parts and the loss of power incurred in putting the mass of valves and gear into motion and stopping it twice at each stroke of the piston while running at high speeds, said starting and stopping having also a very prejudicial effect upon the engine by reason of the violent jarring of the parts. Further, in such engines, whether single or double acting and whether working with reciprocating valves or with rotary valves, the governor has usually been mounted, either in the flywheel or on the crank-shaft, so as to be driven directly by the rotation of the crank-shaft, or it has been arranged to be driven from the crank-shaft by gearing therefrom. Also in all such cases the governor has been connected to the throttle-valve or equivalent device (hereinafter called the "regulating-valve") for regulating the admission of steam to the engine in such a manner as to involve either the passing of a spindle connecting the governor and the regulating-valve through a stuffing-box or the like in those cases where the governor has been situated outside of the steam-chest or the passing of the spindle that drives the governor likewise through a stuffing-box or the like in those cases where the governor has been arranged inside the valve-chest. In all such cases additional friction of the working parts and additional complication of the steam-joints have been incurred.

The present improvements have for their object to obtain efficient regulation of the steam admission to the engine-cylinder with fewer joints and less friction than heretofore and with a minimum steam-space or clearance between the regulating-valve and the main steam-admission valve.

In a high-speed single-acting steam-engine constructed in accordance with the present invention the steam is admitted to and exhausted from the steam end of the engine-cylinder by means of a rotary valve (hereinafter called the "main admission-valve") fixed on a spindle which is rotated by suitable gear at the same speed as the engine crank-shaft, so that the valve makes one complete revolution for each revolution of the crank-shaft. The spent steam exhausted through the main admission-valve from the upper or steam end of the cylinder may be admitted to and exhausted from the lower end of the cylinder, so as to form a cushion for the piston at the end of its downstroke, by means of a rotary valve (hereinafter called the "secondary exhaust-valve") which is fixed on the same spindle as the main admission-valve and revolves at the same speed therewith. The supply of steam to the main admission-valve is regulated either directly by a valve (hereinafter called the "regulating-valve") which is arranged to revolve normally at the same speed as the main admission-valve or indirectly by said revolving regulating-valve through a ported fixed ring or equivalent which is arranged between the regulating-valve and the inlet-face of the main admission-valve. The engine-governor is placed inside the steam-chest and is mounted directly on the spindle of the main admission-valve. The governor is arranged to act directly upon the regulating-valve by shifting the latter relatively to the main admission-valve or relatively to the said fixed ring in such a manner as to control the speed of the engine.

Figure 2:
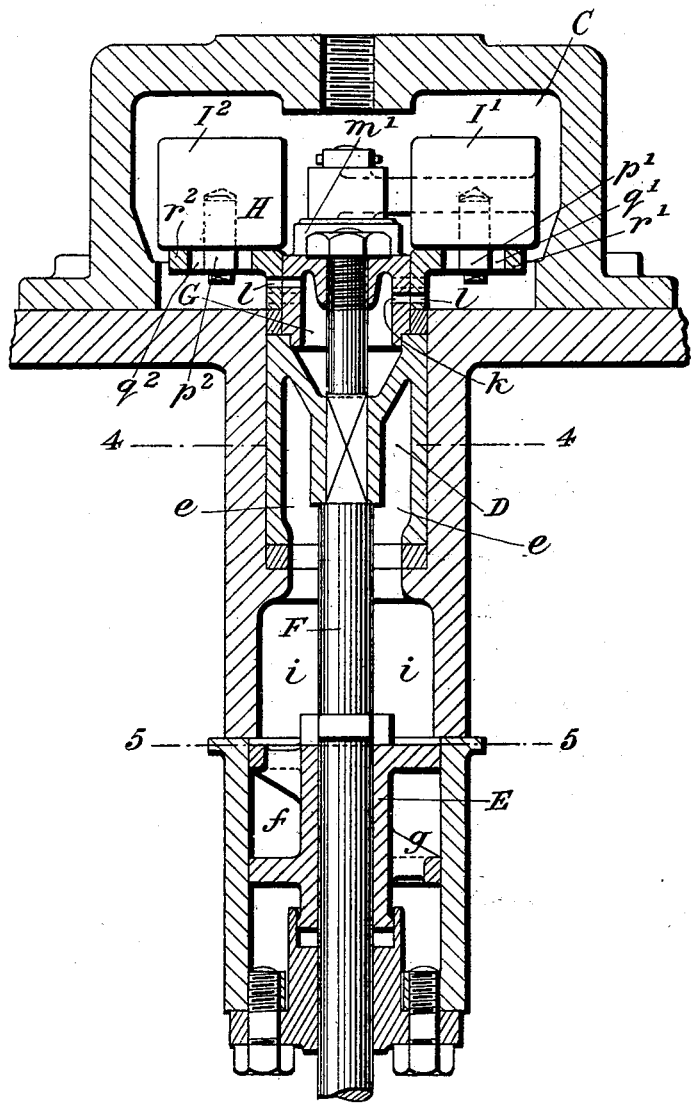
Figure 3:
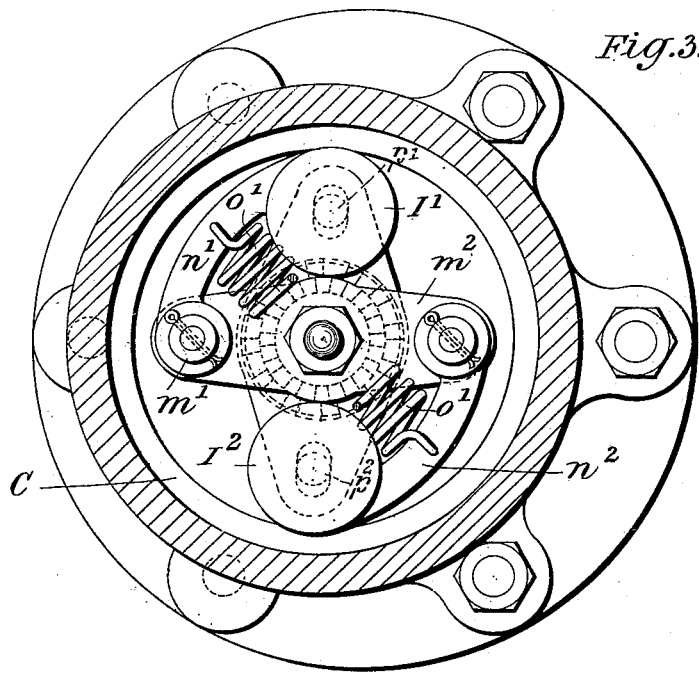
Figure 4:
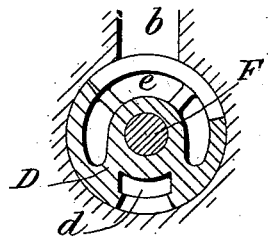
Figure 5:
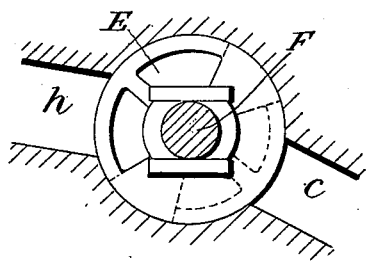
Figure 8:
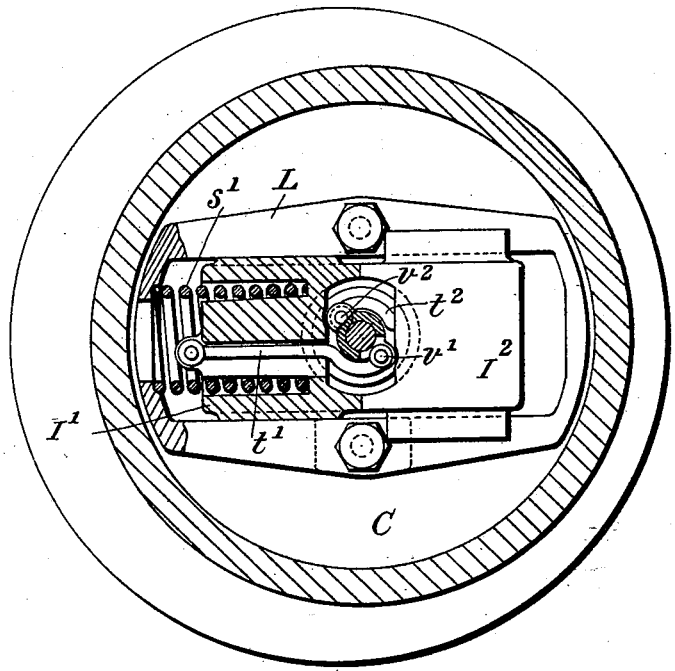
Figure 9:
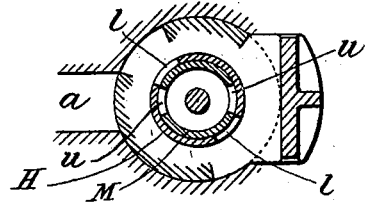
Figure 10:
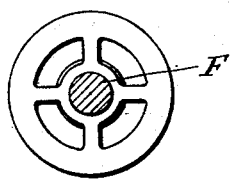

In the accompanying drawings, Figure 1 is a central vertical section of so much of a high-speed single-acting steam-engine constructed in accordance with this invention as is necessary for a clear and complete understanding of the invention. Fig. 2 is a central vertical section taken at right angles to Fig. 1. Fig. 3 is a horizontal section on the line 3 3 of Fig. 1. Fig. 4 is a partial section on the lines 4 4 of Figs. 1 and 2. Fig. 5 is a partial section on the lines 5 5 of Figs. 1 and 2. Fig. 6 is a central vertical section illustrating a modified arrangement. Fig. 7 is a central vertical section taken at right angles to Fig. 6. Fig. 8 is a horizontal section on the line 8 8 of Fig. 6. Fig. 9 is a partial horizontal section on the line 9 9 of Fig. 6. Fig. 10 is a partial horizontal section on the line 10 10 of Fig. 6.

Referring first to Figs. 1 to 5, A represents the engine-cylinder, in which works the engine-piston B.

C is a steam-chest bolted to the top of the cylinder A. It receives live steam through a passage $a$.

D is the main admission-valve, which regulates the admission of live steam to and the exhaust of the expended steam from the cylinder A through one and the same port $b$.

E is a secondary exhaust-valve which regulates the admission of the exhaust-steam from the top end of the cylinder A to the lower end of the same cylinder and also its exit therefrom through one and the same port $c$.

The valves D and E are mounted in line with each other on a common valve-spindle F, which is rotated by any suitable gear at the same speed as the engine crank-shaft, so that each valve D and E makes one complete revolution for each double stroke of the piston B. The main admission-valve D is formed with a live-steam port $d$ and an exhaust-port $e$. The secondary exhaust-valve E is formed with an inlet-passage $f$ and an outlet-passage $g$.

$h$ is a final exhaust-passage leading to the atmosphere or to a condenser.

$i$ is a passage connecting the exhaust-port $e$ of the valve D with the inlet-passage $f$ of the valve E.

Upon the upper end of the valve-spindle F is fixed a cylindrical valve part G, constructed with steam-ports $k$ and forming part of the main admission-valve D.

H is the regulating-valve, constructed as a ring adapted to work steam-tight on the valve part G and having ports $l$ formed in it, which normally coincide with the ports $k$ in the part G. The part G is provided at its upper part with two diametrically opposite horizontal arms $m'$ $m^2$, upon which is mounted the engine-governor, consisting of two governor weights or balls $I'$ $I^2$, mounted on the outer ends of two arms $n'$ $n^2$, pivoted at their inner ends to the aforesaid arms $m'$ $m^2$. The outward movement of the governor-balls is controlled by a spring $o'$, which tends to return the balls to their inward position. The movement of the governor is transmitted to the regulating-valve H by means of studs $p'$ $p^2$, which are screwed, respectively, in the governor-balls $I'$ $I^2$ and are adapted to work in slots $q'$ $q^2$, provided in horizontal extensions $r'$ $r^2$, formed on the upper end of the regulating-valve H and arranged diametrically opposite to each other in a direction at right angles to the direction of the arms $m'$ $m^2$. These extensions $r'$ $r^2$ take the weight of the governor-balls when the engine is not running.

The mode of operation of this apparatus is as follows: In normal working (when the secondary exhaust-valve is employed) the live steam, entering at $a$ into the steam-chest C, passes through the ports $l$ of the regulating-valve and the ports $k$ in the valve part G into the passage $d$ of the main admission-valve D, whence the live steam is admitted through the port $b$ to the upper end of the engine-cylinder A. As the piston reaches the end of its power downstroke the rotation of the valve D has brought the port $e$ into coincidence with the port $b$, and the spent steam exhausts through port $b$ and port $e$ of the valve D into space $i$, through port $f$ of the secondary exhaust-valve E and by port $c$ into the lower end of the cylinder A, where this exhaust-steam aids in pushing up the piston B in its idle upstroke, as shown in Fig. 1. The piston thus rises in equilibrium of pressure acting simultaneously on both sides. When the piston moves down again in its next power downstroke, the greater part of the exhaust-steam from the preceding power downstroke exhausts finally through the port $c$, port $g$ of valve E, and passage $h$ into the atmosphere or to a condenser or to another cylinder, while the remainder of the exhaust-steam is shut in by the rotation of the valve E in the lower end of the cylinder A to form a cushion for the piston B at the end of its power downstroke.

If the speed of the engine increases beyond the normal rate, the governor by the outward movement of its balls will rotate the regulating-valve H relatively to the valve part G so as to move the ports $l$ in the former more or less out of coincidence with the ports $k$ in the latter, and thus diminish the area of steam-supply to the main admission-valve D, with proportionate decrease of the speed of the engine. When the speed of the engine again gradually diminishes, the spring $o'$ will gradually return the governor-balls to their inward position, and the ports $l$ will then return to coincidence with the ports $k$.

It will be observed that the throttle-valve H, on which the governor-balls rotate, is a loose rotating balanced sleeve, the opening of the ports $l$ of this valve having uniform resistance at all positions of the governor-balls because the ports are balanced by being equally distributed around the sleeve.

In the modified arrangement shown in Figs. 6 to 10 the governor, which is driven direct by the rotating valve D, comprises the two governor-weights $I'$ $I^2$, which are adapted to slide along an encircling frame L in opposition to the springs $s'$ $s^2$. The radial movement of the governor-weights is transmitted, by means of connecting-links $t'$ $t^2$ and pins $v'$ $v^2$, to the regulating ring-valve H, which works steam-tight on a fixed ring M and rotates with the main admission-valve D, except so far as it is shifted by the action of the governor, which advances or retards the regulating-valve with respect to the ports in the fixed ring M. The ports $l$ in the regulating-valve H and the ports $u$ in the fixed ring M are so placed that when the governor-weights $I'$ $I^2$ are in their inmost position with respect to the center of the governor or valve-spindle F by reason of the speed of the engine being below the normal number of revolutions the two sets of ports $l$ $u$ are opposite to each other at the moment of the full opening of the steam admission to the cylinder, and when the governor-weights are farthest out on account of the speed of the engine being above the normal the regulating-valve H will be so far revolved around the fixed ring M as to entirely close the steam-opening from the steam-chest through said ports, while at intermediate positions of the governor-weights, corresponding to different intermediate speeds, the aforesaid opening is greater or less in proportion and closes at a proportionately later or earlier period of the power stroke of the piston.

As it is sometimes desirable that the speed of the engine should be capable of being reduced for a short time below its normal working rate, I provide means by which the aforesaid fixed ring M can be moved to a small extent against the direction of rotation of the regulating-valve H, so that the closing of the opening through the ports in the fixed ring M may take place earlier in the period of the revolution of the engine. The effect of such regulation of the position of the fixed ring M, which may be produced by means of the handle K (shown in Fig. 6) or by equivalent means from the outside of the valve-chest, is to entirely cut off the admission of steam to the cylinder when the governor-weights are at less than their extreme outward position. The consequence of this is that the speed of the engine will be slowed, because the centrifugal action of the balls in connection with the springs is so arranged that only a portion of the stroke of the balls is necessary for the regulation of the speed, and the balls are so arranged in relation to the springs that a large difference in speed is covered from their extreme inward to their extreme outward positions.

What I claim, and desire to secure by Letters Patent, is—

1. In a steam or other fluid pressure engine, a centrifugal governor situated within the steam (or motive-fluid) chest in combination with a rotating valve for the admission of the motive fluid to the engine-cylinder, said valve and said governor rotating at the same speed, and a rotating balanced throttle-valve for regulating the passage of the motive fluid to the first-named rotating valve, said throttle-valve rotating with the first-named valve but being angularly shifted by the governor relatively to the first-named valve according as the speed becomes greater or less, whereby the ports supplying said motive fluid to said first-named valve are more or less throttled or cut off by said throttle-valve according to the position of the governor-balls, substantially as set forth.

2. In a steam or other fluid pressure engine a centrifugal governor situated within the steam (or motive-fluid) chest, in combination with a rotating valve for the admission of the motive fluid to the engine-cylinder, a rotating exhaust-valve to said cylinder, said governor, said admission-valve and said exhaust-valve being all driven by one and the same spindle, and a rotating balanced throttle-valve for regulating the passage of the motive fluid to the first-named rotating valve, said throttle-valve rotating with the first-named valve but being angularly shifted by the governor relatively to the first-named valve according as the speed becomes greater or less, whereby the ports supplying said motive fluid to said first-named valve are more or less throttled or cut off by said throttle-valve according to the position of the governor-balls, substantially as set forth.

3. In a steam or other fluid pressure engine, the combination of a centrifugal governor situated within the steam (or motive-fluid) chest, a rotating valve for the admission of the motive fluid to the engine-cylinder, said valve and said governor rotating at the same speed, a second rotating valve for regulating the passage of the motive fluid to the first-named rotating valve, and a fixed ring with ports between said two rotating valves, said second valve rotating with the first-named valve, but being angularly shifted by the governor relatively to the first-named valve according as the speed becomes greater or less, whereby the ports of said fixed ring are more or less throttled or cut off by said second valve according to the position of the governor-balls and the supply of motive fluid through the ports of said fixed ring to said first-named valve is proportionately reduced, substantially as set forth.

4. In a steam or other fluid pressure engine, the combination of a centrifugal governor situated within the steam (or motive-fluid) chest, a rotating valve for the admission of the motive fluid to the engine-cylinder, said valve and said governor rotating at the same speed, a second rotating valve for regulating the passage of the motive fluid to the first-named rotating valve, a fixed ring with ports between said two rotating valves, and means for shifting said fixed ring angularly in relation to said second valve, said second valve rotating with the first-named valve but being angularly shifted by the governor relatively to the first-named valve according as the speed becomes greater or less, whereby while the ports of said fixed ring are more or less throttled or cut off by said second valve according to the position of the governor-balls and the supply of motive fluid through the ports of said fixed ring to said first-named valve is proportionately reduced, the speed of the engine can when required be reduced below its normal working rate, substantially as set forth.

In witness whereof I have hereunto signed my name in the presence of two subscribing witnesses.

ALEXANDER BASIL WILSON.

Witnesses:
ALFRED RYBERG,
JOHN WHITMORE.